United States Patent
Hwang et al.

(10) Patent No.: US 6,775,263 B1
(45) Date of Patent: Aug. 10, 2004

(54) FRAME SYNCHRONIZING APPARATUS USING MEMORY

(75) Inventors: Sang-Chul Hwang, Chollanam-do (KR); Dae-Sik Kim, Seoul (KR)

(73) Assignee: Hyundai Electronics Industries Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/507,826

(22) Filed: Feb. 22, 2000

(30) Foreign Application Priority Data

Feb. 22, 1999 (KR) .......................................... 1999-5801

(51) Int. Cl.[7] .................................................. H04J 3/06
(52) U.S. Cl. ........................ 370/350; 370/512; 370/514
(58) Field of Search ................................ 370/350, 324, 370/503, 510, 511, 512, 513, 514, 509; 375/372

(56) References Cited

U.S. PATENT DOCUMENTS

| | | | |
|---|---|---|---|
| 4,347,606 A | * 8/1982 | Hoogeveen | .................. 370/510 |
| 4,748,623 A | 5/1988 | Fujimoto | |
| 5,228,065 A | * 7/1993 | Herzberger | .................. 375/366 |
| 5,420,894 A | * 5/1995 | Boslough et al. | ........... 375/372 |
| 5,615,237 A | * 3/1997 | Chang et al. | ................ 375/368 |
| 6,266,385 B1 | * 7/2001 | Roy et al. | .................... 375/372 |

* cited by examiner

*Primary Examiner*—Chi Pham
*Assistant Examiner*—Nhat Do
(74) *Attorney, Agent, or Firm*—Bryan Cave LLP

(57) ABSTRACT

A frame synchronizing apparatus using a memory in which a frame synchronizing algorithm is embodied in an ASIC (application specific integrated circuit) so as to be used in a circuit for synchronizing a frame in framing/deframing method for improving a performance of ATM(asynchronous transfer mode) cell extraction in high-error wireless environment of WATM(wireless asynchronous transfer mode), and such an algorithm can be employed in a circuit for synchronizing the frame in a received data stream.

5 Claims, 5 Drawing Sheets

FIG. 1
PRIOR ART

| | | | Cell 1 | Cell 2 | Cell 3 | Cell 4 | Cell 5 |
|---|---|---|---|---|---|---|---|
| F | F | O | Cell 6 | Cell 7 | Cell 8 | Cell 9 | Cell 10 |
| S | L | O | R | R | | | |
| S | L | O | R | R | | | |
| S | L | O | R | R | | | |
| S | L | O | R | R | | | |
| S | L | O | R | R | | | |
| S | L | O | R | R | Cell 41 | Cell 42 | Cell 43 | Cell 44 | Cell 45 |

FRAME SYNCHRONIZING APPARATUS USING MEMORY

BACKGROUND OF THE INVENTION

1. Field of the Invention

The present invention relates to an M-ISDN (multi-integrated services digital network), and more particularly, to a frame synchronizing apparatus using a memory in which a frame synchronizing algorithm is embodied in an ASIC (application specific integrated circuit) so as to be employed in a circuit for synchronizing the frame in framing/deframing method for improving performance of ATM (asynchronous transfer mode) cell extraction in high-error wireless environment or WATM (wireless asynchronous transfer mode), and such an algorithm can be employed in a circuit for synchronizing the frame in a received data stream.

2. Description of the Related Art

In general, a frame synchronization algorithm is a portion for synchronizing the frame in a deframer block. The frame synchronization algorithm receives data, and detects synchronization signal from a frame header or sub-frame header. Then, the frame synchronization algorithm makes a payroad portion into cell units, and sends the result to a cell boundary discriminating block with a cell synchronization signal.

A conventional algorithm for detecting a frame synchronization signal based on an STM (state machine) is executed in a wire network having low error rate, and specifically, in an environment where a byte synchronization signal is arranged. A problem may arise when such an algorithm is executed in a wireless environment having a high error rate. Therefore, a synchronization algorithm for overcoming such a high error is required.

FIG. 1 illustrates a conventional frame structure which is considered as desirable when it allows stable extraction of ATM cell in an environment having a high error rate.

Referring to FIG. 1, F denotes a framing header of 2-bytes and has a value of F628 (H), S denotes a sub-frame header of 1-byte and has a value of E8 (H). L denotes a link control channel for exchanging state data between links, O denotes an order wire channel for use in voice communication, and R denotes a reserved channel.

The frame structure has 45 ATM cells, and each ATM cell consists of 53-bytes. A single sub-frame consists of 270 bytes (5+53×5), thus a single frame consists of 2430 (270×9) bytes.

In most cases, system synchronization can be checked by detecting periodical arrival of frame head pattern F628 and sub-frame header pattern E8 at a receiving side.

In an asynchronized state, regularity of simple header patterns may be sought for a resynchronization.

It is desirable to use smaller-sized sub-frame header and frame header so as to reduce an error which may occur at the header, and the sub-frame header and frame header are employed for a convenient and rapid synchronization.

As for the data received from outside, a deframing process is performed. FIG. 2 shows an OOF (out of frame) state and FS (frame synchronization) state, which may occur when such a deframing process is performed.

The OOF state is where two consecutive errors occur at the frame header pattern or sub-frame header pattern, and six consecutive errors occur at the cell boundary discriminating block.

To return to the frame synchronization state, it is required that the last four sub-frames have three error-zero frame headers or sub-frame headers.

As described above, only the sub-frame header and frame header are checked, thus allowing a rapid synchronization in a high-error environment.

Frame synchronization may be more easily obtained by comparing the sub-frame header and the frame header without performing an HEC (header error check) for the cell header.

In such a conventional cell-based method, cell extraction is accomplished only by an HEC. However, in the frame-based cell extraction algorithm, an HEC is performed for the sub-frame header, frame header, and cell-header.

A process of implementing frame synchronization algorithm using a conventional shift register will be explained with reference to FIG. 3.

Referring to FIG. 3, an apparatus for implementing the frame synchronization algorithm includes a shift register 11 of 812-bytes for storing three sub-frames and headers H1 to H4, a pattern comparing unit 12 for comparing four header values, two adders 13 and 14 for adding an output of the pattern comparing unit 12, a synchronization declaration unit 15 for declaring synchronization or asynchronization from an output of adders 13 and 14.

In such a configuration using a conventional shift register, the input data enters into the shift register 11 for storing three sub-frames and the four headers H1 to H4.

When the output of the shift register 11 enters into the pattern comparing unit 12, the pattern comparing unit 12 compares four header (frame header or sub-frame header) values. If the value is larger than 3, the synchronization declaration unit 15 outputs a sub-frame header synchronization signal sfrm_sync and declares frame synchronization (FS), thus generating a header enable signal.

At the FS state, a frame header synchronization signal frm_sync is output. Then, referring to the most recent headers H1 and H2, asynchronization (OOF) is declared if HEC_error value is 1.

FIG. 3 illustrates a case where the shift register 11 is used as a history buffer.

In such a conventional configuration, the deframer requires frame synchronization signal for a stable ATM cell extraction in a high-error wireless environment or WATM. In addition, the shift register is used as means for storing data of four sub-frames. However, the shift register 11 of 812-bytes may significantly increase a circuit volume, and ASIC gate to 80,000 or higher. Thus, a single frame synchronization unit may constitute an ASIC. However, the frame synchronization unit may not constitute an ASIC together with other blocks (e.g., FEC (forward error correcting) block).

SUMMARY OF THE INVENTION

Therefore, it is an object of the present invention to significantly reduce number of gates by implementing a history buffer using a memory in a frame synchronization algorithm.

To accomplish the above object of the present invention, there is provided a frame synchronizing apparatus using a memory in which three counters of which reset values differ from each other by one sub-frame unit are employed so as to designate a write address and a read address, and a bit clock is used so as to process four readings during a period of one data cycle.

BRIEF DESCRIPTION OF THE DRAWINGS

The present invention will become more fully understood from the detailed description given hereinafter accompanying drawings, which are given by way of illustration only, and thus are not limitative of the present invention, and wherein:

FIG. 1 illustrates a frame structure employed in designing a common frame synchronization algorithm;

DETAILED DESCRIPTION OF A PREFERRED EMBODIMENT

The present invention will be explained in more detail with reference to the attached drawings.

Figure 2:
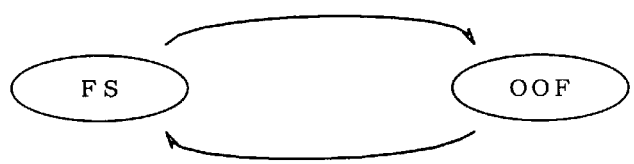
FIG. 2 illustrates a frame synchronization state in a conventional frame synchronization algorithm.
Figure 3:
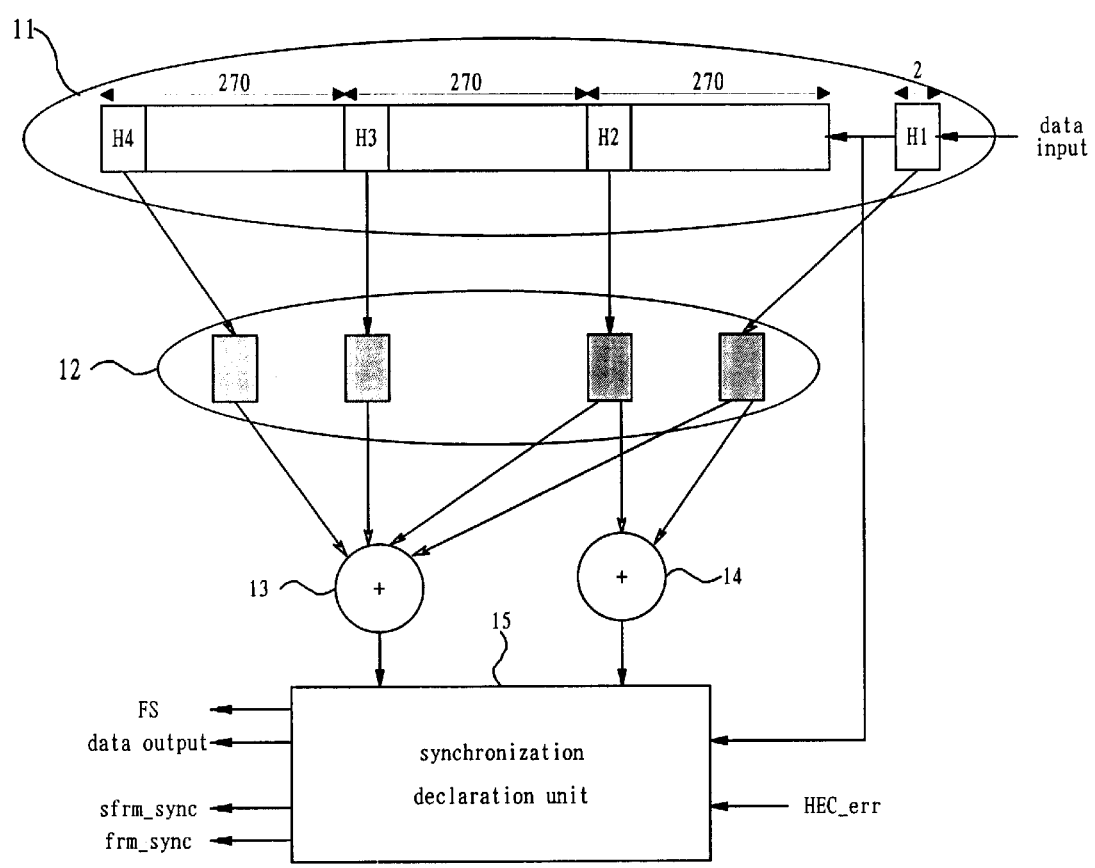
FIG. 3 is a block diagram illustrating a frame synchronizing apparatus using a conventional shift register.
Figure 4:
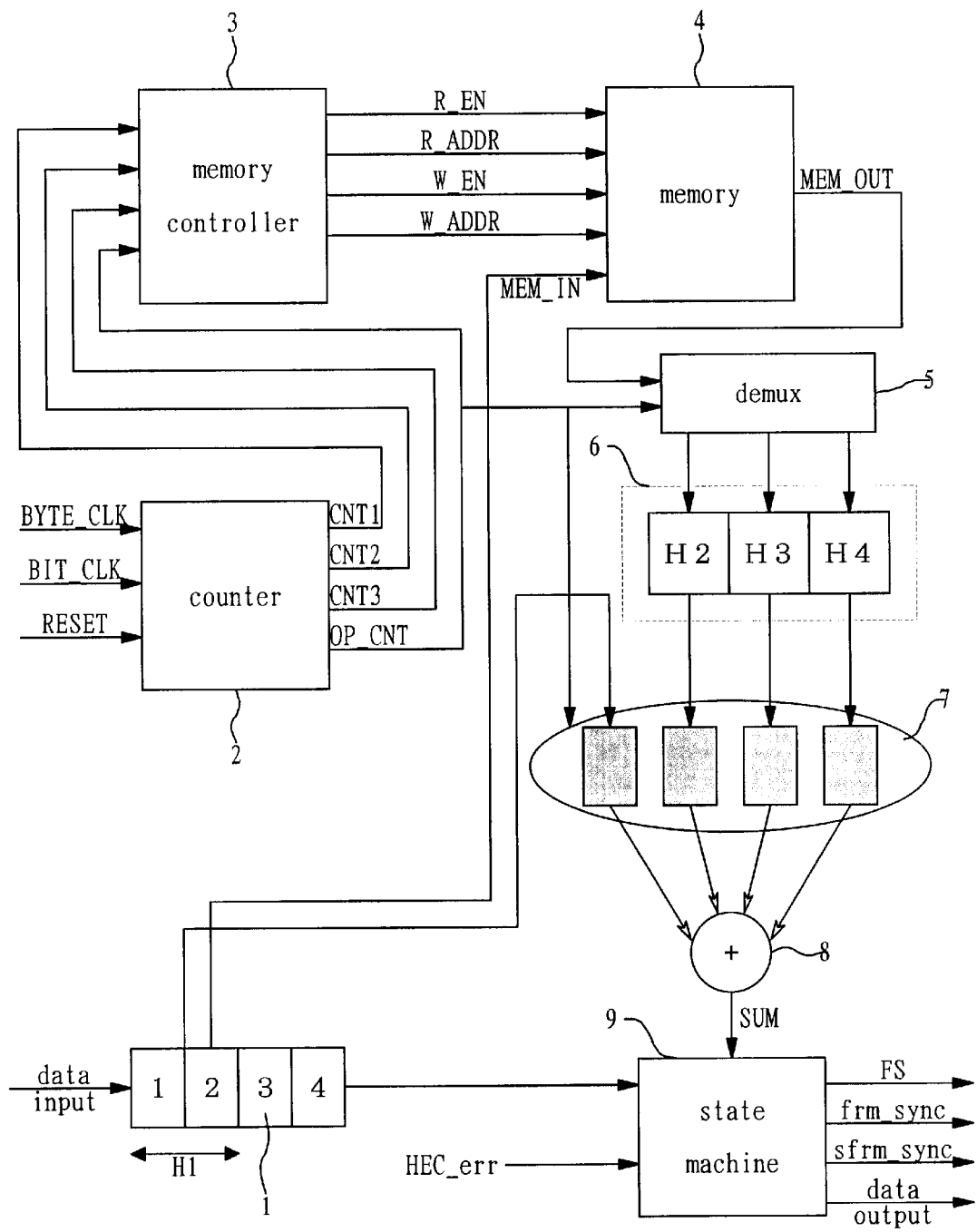
FIG. 4 is a block diagram illustrating a frame synchronizing apparatus using a memory according to the present invention.

FIG. 4 is a block diagram of a history buffer embodied with an 810×8 bit memory.

Referring to FIG. 4, the history buffer includes a shift register 1 of 4-bytes for shifting input data to 4-bytes, a counter 2 for performing a counting in accordance with an input byte clock and a reset signal, a memory controller 3 for controlling a memory from first to third counts output from the counter 2, a memory 4 of 810×8 bits controlled by the memory controller 3 and which stores three sub0frames, a demux 5 for demultiplexing an output OP_CNT of the counter 2 and an output of the memory 4, a buffer 6 for storing three headers output from the demux 5, a pattern comparing unit 7 for comparing header value of buffer H1 of the shift register 1 with that of buffers H2 to H4 of the buffer 6, an adder 8 for adding outputs of the pattern comparing unit 7, and a state machine 9 for receiving the added value and which declares synchronization when the added value is 3 or higher.

The frame synchronizing apparatus of the present invention operates as follows.

Differently from the shift register 1, the memory 4 of the present invention may read and/or write data only once for every operation. In addition, the data remains in the same address when it is once stored. As a result, the peripheral logic for controlling the memory 4 becomes complicated.

In addition, since three times of reading, one time of writing, and one time of pattern comparison are required to be performed during a single data cycle, a bit clock as well as a byte clock may be employed.

That is, when the data is input to the shift register 1, the secondary delayed data is input to a memory input MEM_IN of the memory 4.

The counter 2 operates first to third counters (which are 10-bits) for designating reading and/or writing addresses of the memory 4, and an operation counter OP_CNT which is 4-bit counter for designating an overall operation.

Here, a first counter CNT1 is initialized to 0, a second counter CNT2 is initialized to 270, and a third counter CNT3 is initialized to 540 when reset.

The difference of 270 exists among those counters because the memory 4 reads data skipping over 270 addresses.

The first to third counters CNT1 to CNT3 count up to 809, and repeat starting from 0.

This is because the memory 4 for storing three sub-frames is 810×8 bits, and it is required that the writing starts from 0 when the address 809, i.e., end address of the memory 4, is written.

The operation counter of the counter 2 designates operation of the memory controller 3, and is reset to 0 when it is initialized as a selection signal for demultiplexing the read data. The operation counter has values of 1 to 8 during operation.

Figure 5:
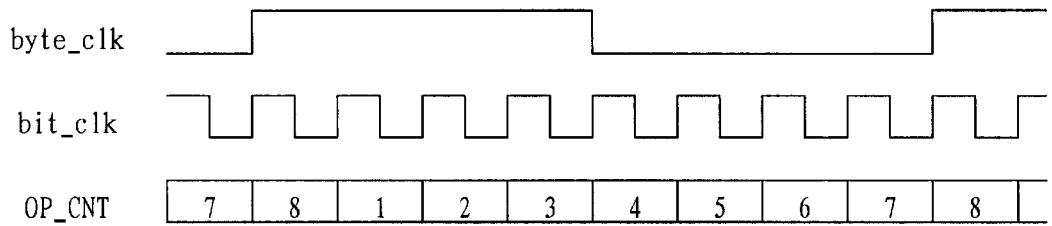
FIG. 5 illustrates waveform of input signal of a counter according to the present invention.

Value of the counter 2 uses both byte clock BYTE_CLK and bit clock BIT_CLK, and FIG. 5 illustrates relations among the byte clock BYTE_CLK, bit clock BIT_CLK, and operation counter OP_CNT.

The memory controller 3 generates memory input signals, i.e., read enable R_EN, write enable W_EN, read address R_ADDR, and write address W_ADDR signals, and outputs the same to the memory 4.

Figure 6:
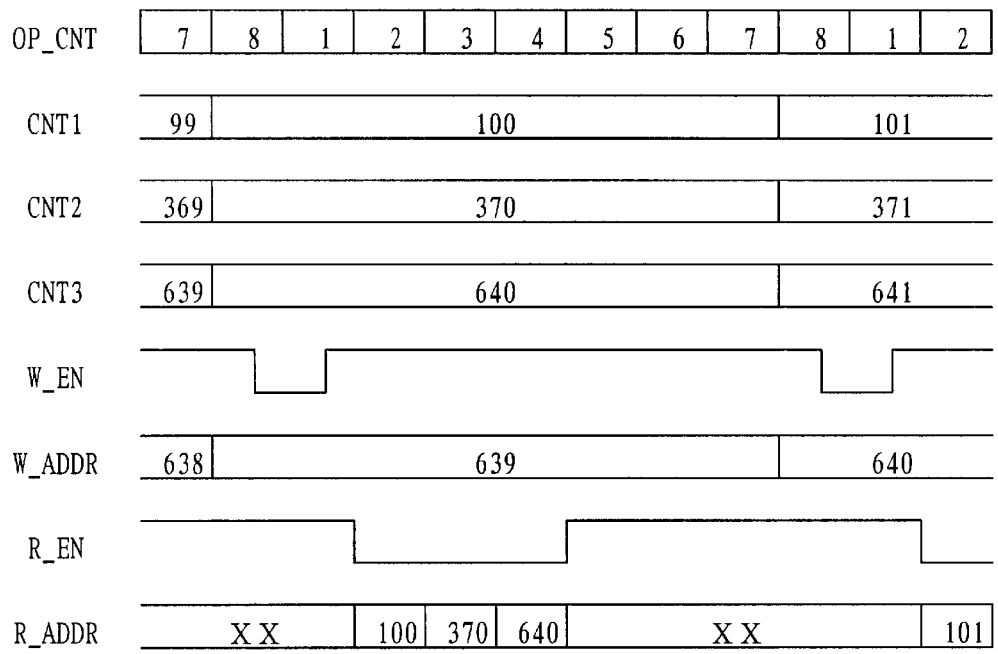
FIG. 6 illustrates wave form of input/output signals of a memory controller according to the present invention.

FIG. 6 illustrates a relation among input/output signals of the memory controller 5, wherein the W_EN signal ranges half sections when OP_CNT value is 8 and 1, respectively, and W_ADDR signal has a value which is calculated by subtracting 1 from the first count CNT1.

R_EN signal has the value of the second count CNT2 when OP_CNT value is 3, and the value of the third count CNT3 when OP_CNT value is 4.

Figure 7:
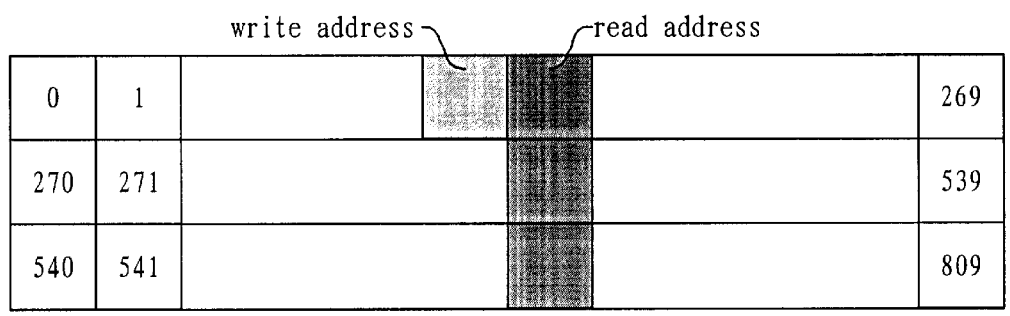
FIG. 7 illustrates a configuration of the memory according to the present invention.

The memory is an 810×8 bit dual port RAM configured as shown in FIG. 7, has addresses from 0 to 809, and is controlled by the memory controller 3.

Differently from the shift register, the memory 4 is allowed to read and write only once for every trial. The shift register may read four data at the same time in a fixed location (header location) since data shifts repeatedly for every clock. However, the data stored in any address of the memory 4 may not be changed until the next writing occurs, and only the data in the address of the memory 4 may be read. Therefore, it is required that the read address and write address differ in every clock and may read four data during a data cycle period (byte), so that the memory 4 effects the same as the shift register.

The memory controller 3 allow a reading operation when writing from address 0 to address 809 is completed so as to prevent a problem which may otherwise occur in the process of simulation.

The demux 5 serves to demultiplex the data read from the memory 4 according to OP_CNT value.

Figure 8:
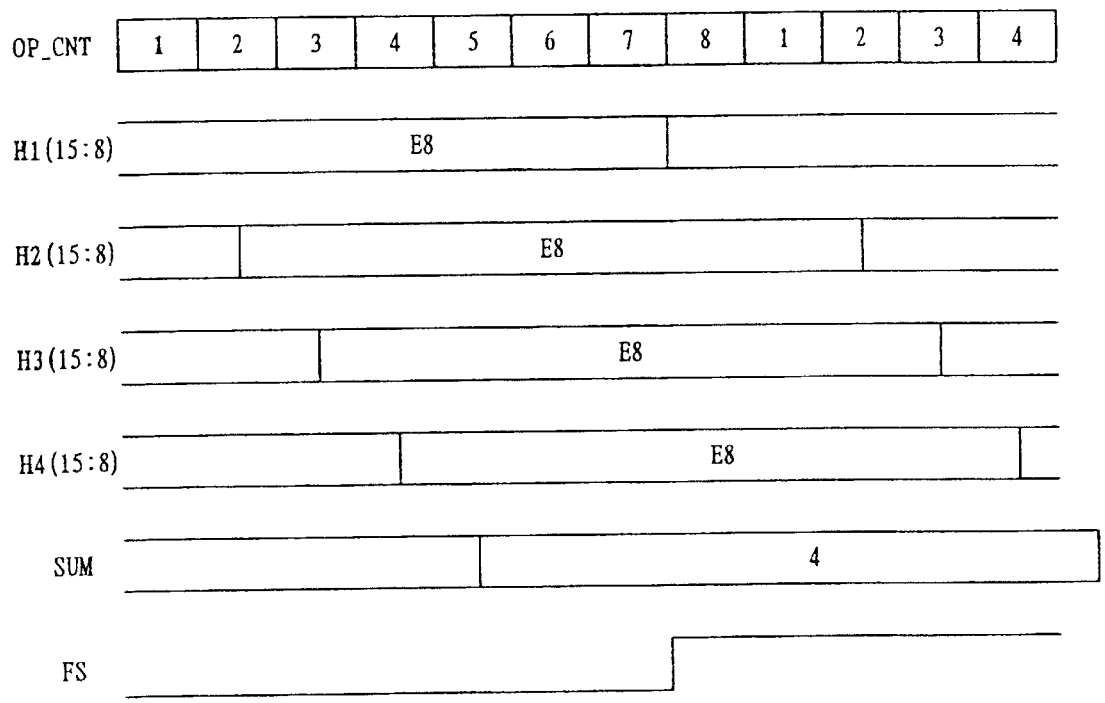
FIG. 8 illustrates waveform of input/output signals of the pattern comparing unit and state machine according to the present invention.

If, as shown in FIG. 8, OP_CNT value is 2, the read memory data value is input to the lower 8-bits of the header H2 of the header buffer 6. If OP_CNT value is 3, the read memory data value is input to the lower 8-bits of the header H3 of the header buffer 6. If OP_CNT value is 4, the read memory data value is input to the lower 8-bits of the header H4 of the header buffer 6.

Then, the input lower 8-bits in the headers H2, H3, and H4 are shifted to the upper 8-bits.

Subsequently, the pattern comparing unit 7 receives 16-bits of the headers H1, H2, H3, and H4 of the header buffer 6 if the OP_CNT has the value of 5, and allows the adder 8 to add 1 to the value of the adder 8 if the received 16-bits is F628 (H) or the upper 8-bits is E8 (H)

The state machine 9 receives so-added value from the adder 8, and declares synchronization when the added value is 3 or higher.

Then, the sub-frame counter is operated so as to output the sub-frame header synchronization signal frm_sync.

The state machine 9 declares asynchronization (OOF) if two consecutive frame headers or sub-frame headers are not input when HEC_err is input as 1 and a header enable signal is present in the cell boundary discriminating block (that is, 6 cell header error occur) (FS=0)

As described above, the present invention is advantageous in that the memory is employed instead of the shift register and the number of gates is significantly decreased, thus allowing easy construction of ASIC or EPGA.

To compare the four frame headers or sub-frame headers, the memory for storing the three sub-frames and the 4-byte shift register are provided instead of a memory for storing the four sub-frames, thus reducing memory capacity.

The frame synchronizing apparatus of the present invention may be employed in a framing/deframing method for a stable cell extraction in a high-error wireless environment or WATM. In addition, the present invention may be applied to synchronize data stream having different frame structure, and to synchronize a code word of FEC at a receiving side.

What is claimed is:

1. A frame synchronizing apparatus using a memory comprising:

a 4-byte shift register for shifting input data to 4-byte data;

a counter performing a counting in accordance with an input bit clock, byte clock, and reset signal;

a memory controller for controlling a memory in accordance with first to third count signals output from said counter;

a memory controlled by said memory controller so as to store three-sub frames;

a demux for demultiplexing an output of said counter and an output of said memory;

a buffer for storing three headers output from said demux;

a pattern comparing unit for comparing a header value of said 4-byte shift register and a header value of said buffer, and allows an adder to add 1 if a value of 16-bits is F628 or a value of an upper 8-bits is E8;

an adder for adding an output of said pattern comparing unit; and a state machine for receiving an added value from said adder and declaring synchronization if said added value is higher than a predetermined value.

2. A frame synchronizing apparatus using a memory according to claim 1, wherein said memory receives data inputted to said 4-byte shift register and delayed for a second time.

3. A frame synchronizing apparatus using a memory according to claim 1, wherein said counter further comprises 10-bit first to third counters for designating read and write addresses of said memory, and a 4-bit counter for designating an overall operation of said counter.

4. A frame synchronizing apparatus using a memory according to claim 3, wherein said first to third counters have initialization values having a difference of 270, respectively, so that said memory reads data skipping over 270 addresses.

5. A frame synchronizing apparatus using a memory according to claim 1, wherein said memory is a dual port RAM capable of reading from address 0 to address 809.

* * * * *